United States Patent
Fiedler

(12)
(10) Patent No.: US 7,396,018 B1
(45) Date of Patent: *Jul. 8, 2008

(54) OIL SCRAPER RING FOR PISTONS OF INTERNAL COMBUSTION ENGINES

(75) Inventor: Rolf-Gerhard Fiedler, Wendlingen (DE)

(73) Assignee: MAHLE GmbH, Stuttgart (DE)

( * ) Notice: Subject to any disclaimer, the term of this patent is extended or adjusted under 35 U.S.C. 154(b) by 189 days.

This patent is subject to a terminal disclaimer.

(21) Appl. No.: 10/570,089

(22) PCT Filed: Sep. 2, 2004

(86) PCT No.: PCT/DE2004/001961

§ 371 (c)(1),
(2), (4) Date: Jun. 7, 2006

(87) PCT Pub. No.: WO2005/024276

PCT Pub. Date: Mar. 17, 2005

(30) Foreign Application Priority Data

Sep. 2, 2003 (DE) ................................ 103 40 302

(51) Int. Cl.
*F16J 9/20* (2006.01)
(52) U.S. Cl. .................... 277/434; 277/449; 277/466
(58) Field of Classification Search ............... 277/435, 277/449, 451–453, 455, 466, 437, 476–478, 277/482
See application file for complete search history.

(56) References Cited

U.S. PATENT DOCUMENTS

| 2,154,342 A | * | 4/1939 | Marvin | 277/478 |
| 2,212,042 A | * | 8/1940 | Phillips et al. | 277/478 |
| 2,213,452 A | | 9/1940 | Paton | |
| 3,831,952 A | * | 8/1974 | Geffroy | 277/447 |
| 5,193,820 A | | 3/1993 | Tsuchiya et al. | |

(Continued)

FOREIGN PATENT DOCUMENTS

DE 14 25 456 A 11/1968

(Continued)

OTHER PUBLICATIONS

International Search Report.

*Primary Examiner*—Vishal Patel
(74) *Attorney, Agent, or Firm*—Collard & Roe, P.C.

(57) ABSTRACT

The invention relates to an oil scraper ring for pistons of internal combustion engines. The oil scraper ring comprises a disc that is provided with parallel flanks and a bearing surface having an asymmetrical crowned form with a vertex line extending over the periphery of the disc. A bracing spring arranged in a ring groove of the piston and comprising a spring groove side opposing the piston head and a spring groove side facing the piston head presses the disc radially against the friction and the abrasion of the bearing surface. To this end, at least one of the spring groove sides extends at an angle in relation to the piston axis in such a way that it is radially outwardly inclined to the bracing spring end oriented towards the cylinder, the bearing surface of the disc being embodied in such a way that it corresponds to an almost worn end contour in the started engine state, and, when the oil scraper ring is mounted in the piston, the vertex line of the bearing surface is oriented in the direction of the ring groove side opposing the piston head.

4 Claims, 1 Drawing Sheet

U.S. PATENT DOCUMENTS 5,964,467 A * 10/1999 Hirata .................. 277/447
7,261,301 B2 * 8/2007 Fiedler .................. 277/434

FOREIGN PATENT DOCUMENTS

| DE | 33 05 385 C1 | 3/1984 |
| DE | 38 33 322 A1 | 12/1989 |
| DE | 43 005 31 C1 | 2/1994 |
| DE | 44 29 649 C2 | 2/1996 |
| EP | 0 857 900 A | 8/1998 |
| EP | 1 089 026 A | 4/2001 |
| FR | 8 38 290 | 3/1939 |
| FR | 1 358 912 | 3/1964 |
| FR | 2 723 401 A | 2/1996 |
| JP | 57 73340 | 5/1982 |

* cited by examiner

OIL SCRAPER RING FOR PISTONS OF INTERNAL COMBUSTION ENGINES

CROSS REFERENCE TO RELATED APPLICATIONS

Applicant claims priority under 35 U.S.C. §119 of German Application No. 103 40 302.7 filed September 2, 2003. Applicant also claims priority under 35 U.S.C. §365 of PCT/DE2004/001961 filed Sep. 2, 2004. The international application under PCT article 21(2) was not published in English.

BACKGROUND OF THE INVENTION

The invention relates to an oil wiping ring for pistons of internal combustion engines, having a lamella consisting of strip steel, provided with parallel walls, whose working surface has a barrel-shaped asymmetrical shape, having a vertex line that extends over the circumference of the lamella, whereby a spreading spring disposed in a ring groove of the piston and having one spring groove wall facing away from the piston crown side and one spring groove wall facing the piston crown side presses the lamella radially against the cylinder wall.

In order to prevent too much motor oil from getting into the combustion chamber, which not only results in high oil consumption but also has negative effects on the emission behavior of the engine, a sufficient tangential force of the oil wiping rings is required to produce a radial contact pressure against the cylinder wall and thereby a good oil wiping effect. However, this results in a high surface pressure against the working surfaces of the lamellae, and therefore also a high friction power during engine operation. This friction power worsens the degree of effectiveness of the internal combustion engine and accordingly increases the fuel consumption. The design of the tangential force of the oil wiping rings is therefore always a compromise between minimal friction power and maximal oil wiping effect. All of the measures for reducing the friction power during engine operation, without reducing the tangential force, thereby facilitate the design of the oil wiping rings, i.e. improve the degree of effectiveness of the engine.

Accordingly, an attempt was made, for oil wiping rings of the type stated, aside from a special configuration of the spreading spring, to shape the working surfaces of the lamellae in such a manner that these meet the aforementioned requirements.

Asymmetrical working surfaces of oil wiping rings or piston rings are known from DE 38 33 322 A1, DE 43 00 531 C1, or DE 44 29 649 C2. Likewise, a piston ring is known from DE 33 05 385 C1, which is disposed in a ring groove of a piston, the ring groove side walls of which run preferably parallel, but at a slant to the piston axis, in order to guarantee a better seal. Ring groove side walls that are oriented at a slant and parallel to one another are also known from the Japanese utility model 57-73340. These previously known embodiments, however, relate to compression rings, whose requirements with regard to surface pressure are very low, while oil wiping rings demand great surface pressures.

SUMMARY OF THE INVENTION

It is the task of the invention to indicate a multi-part oil wiping ring for a piston of an internal combustion engine, which has an improved oil wiping effect as compared with the known state of the art, at reduced friction and a reduced wear of the working surface.

This task is accomplished by means of an oil wiping ring in which at least one of the spring groove walls runs at a slant radially outward up to the cylinder-side end of the spreading spring, at an angle b to the piston axis, whereby preferably, the spring groove wall that faces away from the piston crown side is disposed at a slant away from the piston crown. The working surface of the lamella is configured in such a manner that it corresponds to an almost worn end contour in the run-in engine state, whereby in the assembled state of the oil ring in the piston, the vertex line of the working surface is disposed towards the ring groove wall that faces away from the piston crown side.

The working surface of the lamella is characterized by an asymmetrical incline having a greatly reduced barrel shape as compared with the state of the art, whereby the working surface contour can be approximately described by means of a polynomial of the second order.

In another exemplary embodiment of the invention, a one-piece spreading spring is provided, which has two spring grooves and is disposed in the ring groove 7. The spring grooves are configured in such a manner that the spring groove wall facing away from the piston crown side takes up an angle b.

By means of the working surface configuration according to the invention, and the placement of the lamella in the spreading spring configured according to the invention, a reduction in the friction power of the oil wiping ring as a whole is achieved, by means of more advantageous hydrodynamic conditions at the lamella, without any reduction in tangential force, as a function of the stroke movement of the piston, whereby the oil wiping function is maintained to its full extent, with the change in the stroke movement of the piston. The reduction in the friction power results in an improvement of the degree of effectiveness of the engine, or the oil wiping behavior can be improved by means of an increase in the tangential force, with an unchanged friction power level. Furthermore, a reduction in the axial height of the total ring package can be achieved, as compared with ring packages according to the state of the art.

Practical embodiments of the invention are the subject of the dependent claims.

BRIEF DESCRIPTION OF THE DRAWINGS

An exemplary embodiment of the invention is described below, using the drawings. These show FIG. 1 a cross-section of the oil wiping ring according to the invention, in a first embodiment.

DETAILED DESCRIPTION OF THE PREFERRED EMBODIMENTS

Figure 1:
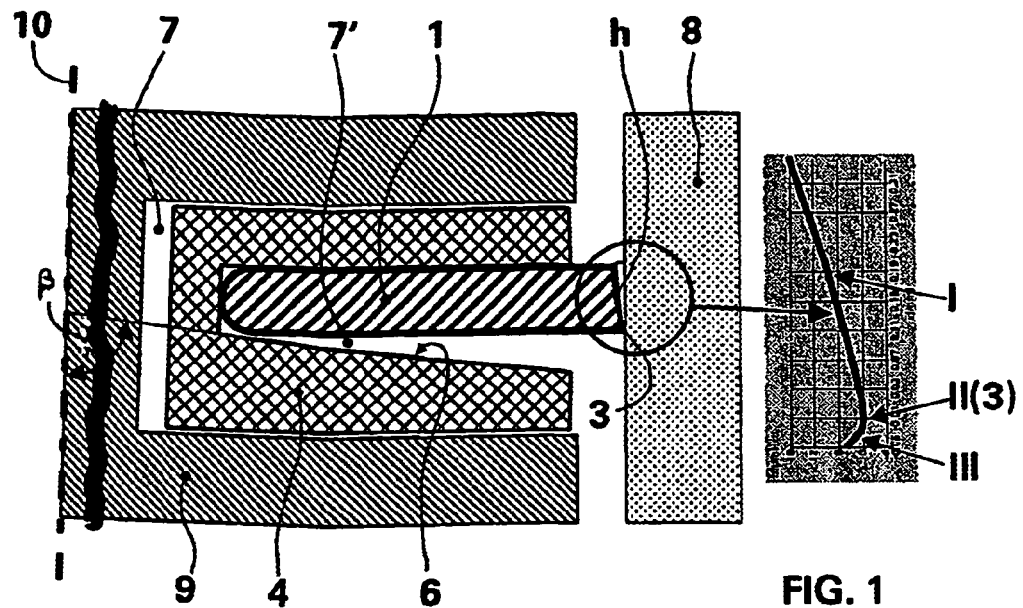

As is evident from FIG. 1, an oil wiping ring consists of a lamella 1 and a spreading spring 4 that presses the lamella radially against a cylinder wall 8. The spreading spring 4 is inserted into a ring groove that has ring groove walls oriented at 90° degrees relative to the piston axis 10, and possesses an outer shape and size that corresponds to the ring groove. The spreading spring has a spring groove 7' having a spring groove wall 5 that represents the side facing the piston crown side, and a spring groove wall 6 that represents the side facing away from the piston crown. According to the invention, the spring groove wall 5 that faces the piston crown side is disposed oriented at an angle of 90° relative to the piston axis 10, whereby the spring groove wall 6 that faces away from the piston crown runs at an angle β inclined away from the piston crown, up to the outside spring circumference. Preferably, the angle β amounts to 85° to 87° degrees of angle.

According to the invention, the lamella 1 has a barrel-shaped asymmetrically shaped working surface h with a vertex line 3 that extends over the circumference of the lamella, whereby the vertex line 3 acts for oil wiping, as an edge that stands in contact with the cylinder wall 8. According to FIG. 1, the lamella 1 is disposed in the piston, in its assembled state, in such a manner that its vertex line 3 (edge) is disposed towards the spring groove wall 6 that faces away from the piston crown side. According to the invention, the working surface h of the lamella has a shape that corresponds to a run-in process of several hundred hours of engine operation. This is characterized in that the working surface h of the lamella 1, in cross-section, follows the asymmetrical shape of a polynomial of the second order in a first segment (I), with $h(x)=ax+bx^2$, whereby x=working surface coordinates in the Cartesian coordinate system in mm, and a, b are coefficients, with a being defined by the ratio of the axial wall play of the lamella relative to the width of the lamella; b being defined as the amount of the working surface curvature; a supporting vertex (II) $h(x=0)$ configured as an edge, and in a third segment (III) follows the asymmetrical shape of the function $h(x)=cx^2$, with c as a multiple of b. As an example for a lamella having a thickness of 0.4 mm, a value $h(x)=35x+50X^2$ is obtained. With this, the cross-section curves shown in accordance with FIGS. 1 and 2 can be achieved, with x as the working surface coordinate in mm, and h(x) as the barrel shape in μm. It is understandable that the coefficients of this polynomial must be coordinated with the specific application, whereby essential parameters in this connection are the cylinder diameter, the dimensions of the lamella cross-section, and the axial play ratios of the installed oil wiping ring in the ring groove. The typical barrel shape of the working surface h according to the invention amounts to approximately 2 to 10 μm/0.4 mm, according to the invention, as compared with the embodiments according to the state of the art of 3 to 15 μm/0.15 mm.

Figure 2:
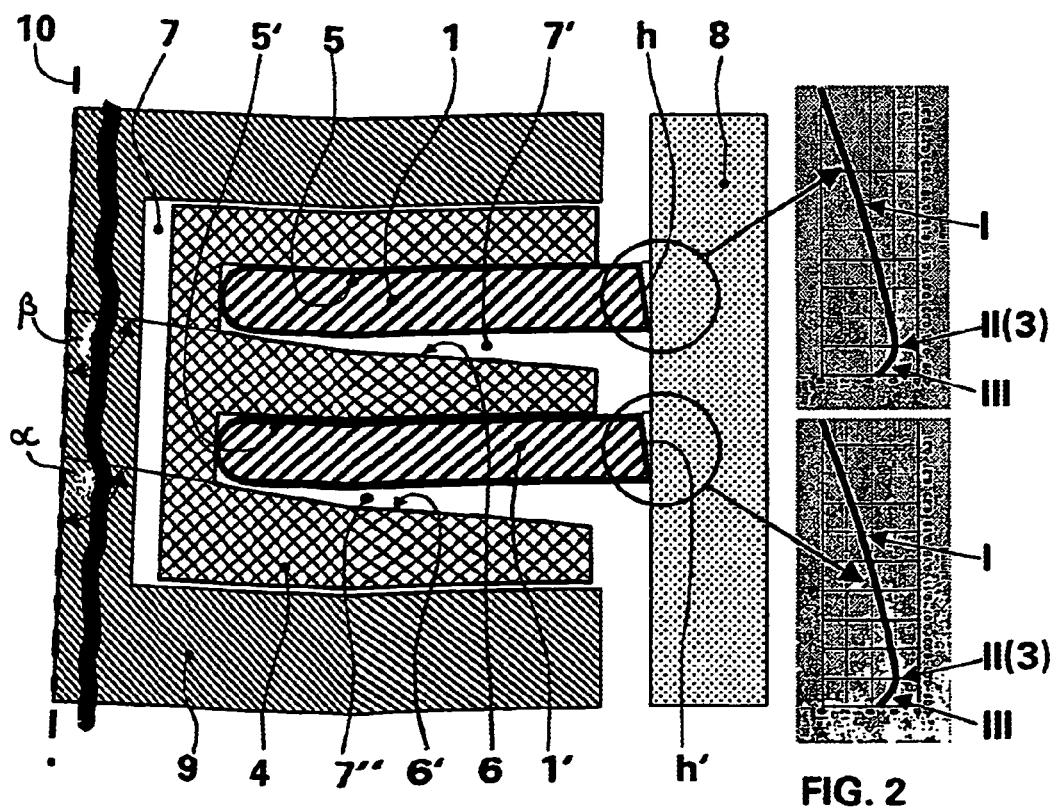
FIG. 2 a cross-section of the oil wiping ring according to the invention, in a second embodiment.

According to another embodiment according to FIG. 2, the spreading spring 4 has a second spring groove 7", below a first spring groove 7', the spring groove walls 5 and 5' of which, on the piston crown side, run parallel to the transverse piston axis 10. The spring groove wall 6 and 6' facing away from the piston crown runs radially outward up to the outside spring wall, inclined at an angle of 3 to 5 degrees. In this exemplary embodiment, both of the vertex lines 3, 3' (edges) of the working surfaces h and h' are disposed facing away from the ring groove wall 5 on the piston crown side.

Functionally, the oil wiping effect that is improved according to the invention results from the fact that the friction force that engages on the working surface h of the lamella in the cylinder axis direction generates a torque that causes the lamella to arch in plate shape. This is possible because the configuration of the V-shaped ring groove 7 prevents a movement of the lamella in the axial direction, particularly at the inner contact point, whereas clearly greater axial movement amplitudes are possible at the outer contact point. The friction force, and therefore the torque, changes its sign as a function of the stroke direction of the piston. Since the amount of the friction force is still dependent on velocity, this results in constant changes in the plate-shaped arch, referred to as dynamic twist. Because of the dynamic twist, the lamella that rests against the spring groove wall that faces the piston head during the stroke away from the combustion chamber—the down stroke—in combination with the asymmetrical incline of the working surface, produces a good oil wiping effect—the "edge" works—while the other position of the lamella, in each instance, has improved hydrodynamics because of the defined barrel shape of the working surface during the up stroke—the "surface" (segment I) works. In this way, the friction power at the lamella, which has a worse oil wiping effect in the twisted state, is reduced. A change in the stroke direction causes the lamella to flip over into the other position, in each instance.

Attention must be paid to ensure orientation of the lamella in the correct position when the oil wiping ring is installed into the cylinder of the engine; this can be guaranteed, for example, by means of color markings on one of the lamella walls.

The production of the working surface shape, i.e. contour can take place by means of lapping, for example.

REFERENCE SYMBOLS 1, 1' lamella, oil wiping ring
3, 3' vertex line (edge)
4 spreading spring
5, 5' spring groove wall facing the piston crown side
6, 6' spring groove wall facing away from the piston crown side
7 ring groove
7' first spring groove
7" second spring groove
8 cylinder wall
9 piston
10 transverse piston axis
h, h' working surfaces

The invention claimed is:

1. A combination oil wiping ring and piston for an internal combustion engine, comprising:
   a piston having a piston crown, a ring groove and cylinder wall;
   a lamella consisting of strip steel, provided with parallel walls, and having a working surface with a vertex line that extends over a circumference of the lamella; and
   a spreading spring disposed in the ring groove and having one spring groove wall facing away from a piston crown side and one spring groove wall facing a piston crown side, said spring pressing the lamella radially against the cylinder wall, wherein at least one of the spring groove walls runs at a slant radially outward up to an end of the spreading spring facing the cylinder wall, at an angle relative to a piston axis,
   wherein the working surface of the lamella is configured so that it corresponds to an almost worn end contour in a run-in engine state,
   wherein when the oil ring is assembled in the piston, the vertex line of the working surface is disposed towards the ring groove wall that faces away from the piston crown side; and
   wherein the working surface of the lamella, in cross-section,
   (a) follows an asymmetrical shape of a polynomial of the second order in a first segment (I), with $h(x)=ax+bx^2$, wherein x=working surface coordinates in the Cartesian coordinate system in mm, and a, b are coefficients, with a being defined by the ratio of axial wall play of the lamellae relative to a width of the lamellae; b being defined as an amount of the working surface curvature;
   (b) has a supporting vertex (II) $h(x=0)$ configured as an edge, and
   (c) in a third segment (III) follows the asymmetrical shape of the function $h(x)=cx^2$, with c as a multiple of b.

2. The combination according to claim 1, wherein the spring groove wall facing away from the piston crown side runs at a slant away from the piston crown, at an angle.

3. The combination according to claim 2, wherein the spreading spring is configured in one piece and has two spring grooves.

4. The combination according to claim 1, wherein the angle comprises a value of 85 to 87 degrees.

* * * * *